United States Patent
Tanaka et al.

(10) Patent No.: US 7,261,373 B2
(45) Date of Patent: Aug. 28, 2007

(54) STRUCTURE OF A RECLINING SEAT

(75) Inventors: Masami Tanaka, Toyota (JP); Takao Komatsubara, Kurashiki (JP)

(73) Assignees: Mitsubishi Jidosha Kogyo Kabushiki Kaisha, Tokyo (JP); Namba Press Works Co., Ltd., Kurashiki-Shi, Okayama (JP)

(*) Notice: Subject to any disclaimer, the term of this patent is extended or adjusted under 35 U.S.C. 154(b) by 0 days.

(21) Appl. No.: 11/544,921

(22) Filed: Oct. 10, 2006

(65) Prior Publication Data

US 2007/0085397 A1    Apr. 19, 2007

(30) Foreign Application Priority Data

Oct. 11, 2005    (JP)    ............... 2005-296522

(51) Int. Cl.
*B60N 2/427*    (2006.01)

(52) U.S. Cl. ............... 297/216.13; 297/354.12; 297/483

(58) Field of Classification Search ........... 297/216.13, 297/216.14, 354.12, 452.18, 452.2, 483
See application file for complete search history.

(56) References Cited

U.S. PATENT DOCUMENTS

| | | | |
|---|---|---|---|
| 5,246,271 A * | 9/1993 | Boisset .................. | 297/362.13 |
| 5,318,341 A * | 6/1994 | Griswold et al. ...... | 297/362.11 |
| 5,641,198 A * | 6/1997 | Steffens, Jr. ........... | 297/216.13 |
| 5,645,316 A * | 7/1997 | Aufrere et al. ........ | 297/216.13 |
| 5,823,627 A * | 10/1998 | Viano et al. ........... | 297/216.13 |
| 6,082,823 A * | 7/2000 | Aumont et al. ......... | 297/452.2 |
| 6,485,098 B1 * | 11/2002 | Vits et al. .............. | 297/216.13 |
| 6,585,325 B1 * | 7/2003 | Pal ............................. | 297/483 |
| 7,093,901 B2 * | 8/2006 | Yamada ..................... | 297/367 |
| 7,201,447 B2 * | 4/2007 | Yamada ..................... | 297/367 |
| 2006/0145522 A1 | 7/2006 | Yamada | |

FOREIGN PATENT DOCUMENTS

JP    2004-290243 A    10/2004

* cited by examiner

*Primary Examiner*—Peter R. Brown
(74) *Attorney, Agent, or Firm*—Birch, Stewart, Kolasch & Birch, LLP (57) ABSTRACT

A reclining seat includes a first locking mechanism for locking a first backrest frame at a sloping position, and a second locking mechanism for locking a second backrest frame at the sloping position. The reclining seat further includes a first shaft for releasing the first backrest frame locked by the first locking mechanism, a second shaft for releasing the second backrest frame locked by the second locking mechanism, and a disengaging unit for transmitting only one-directional rotation of the first shaft to the second shaft. The disengaging unit includes a first plate mounted on the first shaft, and a second plate mounted on the second shaft. The second plate is engaged by the first plate when the first shaft rotates in one direction and is disengaged from the first plate when the first shaft rotates in the opposite direction.

2 Claims, 9 Drawing Sheets

STRUCTURE OF A RECLINING SEAT

BACKGROUND OF THE INVENTION

1. Field of the Invention

The present invention relates to the structure of a reclining seat.

2. Description of the Related Art

Figure 8:
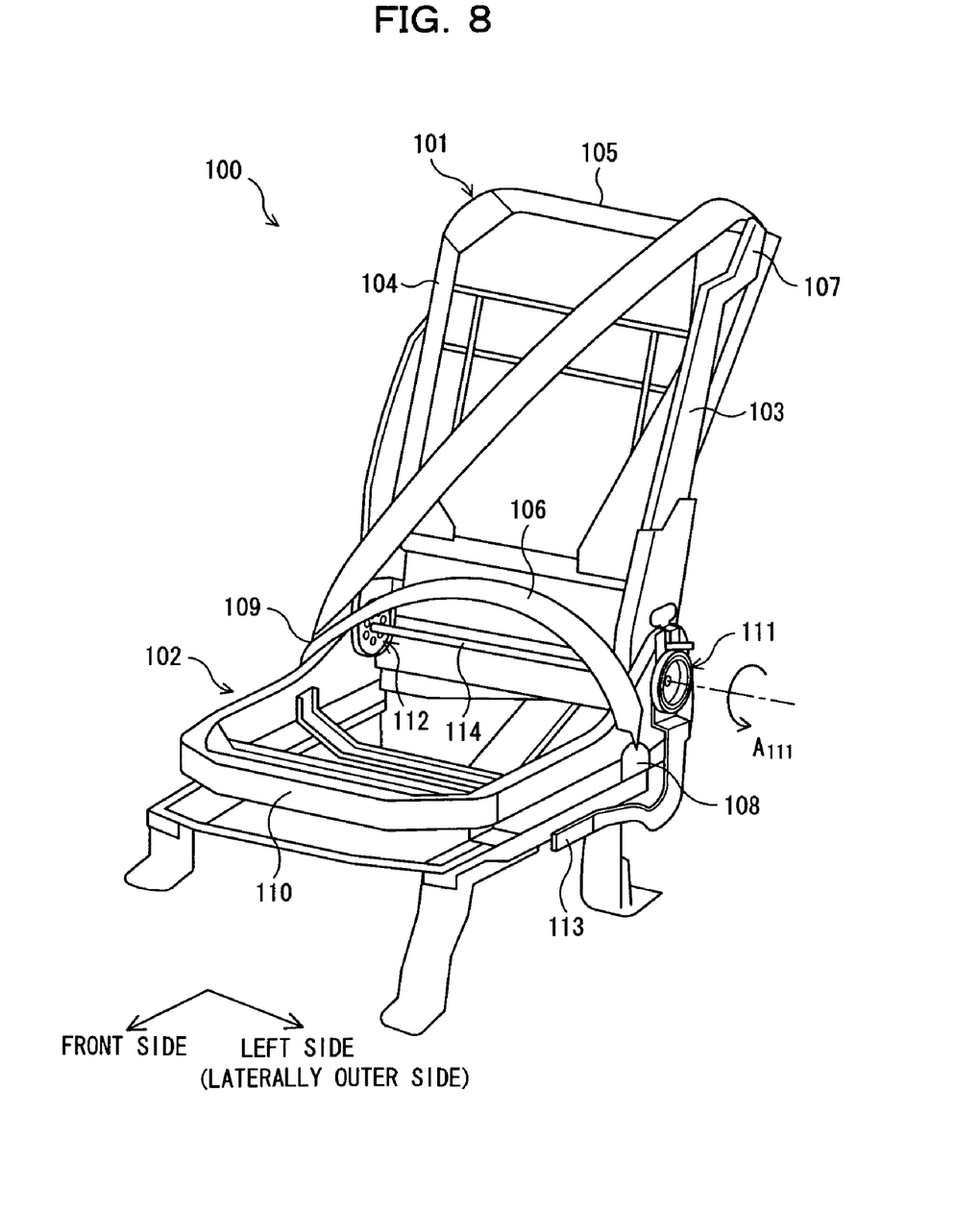
FIG. 8 is a perspective view showing a conventional reclining seat.

A vehicle's reclining seat with a seat belt retractor incorporated in the seat backrest is well known in the related art. This conventional reclining seat 100 is shown in FIG. 8.

The reclining seat 100 chiefly comprises a seat backrest 101 and a seat cushion 102.

The seat backrest 101 includes a laterally outer frame 103 disposed to form the laterally outer side of the seat backrest 101, a laterally inner frame 104 disposed to form the laterally inner side of the seat backrest 101, and an upper frame 105 connecting the upper end portion of the laterally outer frame 103 and the upper end portion of the laterally inner frame 104 together.

The laterally outer frame 103 of the seat backrest 101 has a shoulder anchor 107 provided at its upper end portion for supporting a seat belt 106. The seat cushion 102 includes a cushion frame 110. The cushion frame 110 has a lower anchor 108 provided at its laterally outer end portion for fixing the seat belt 106, and further has a buckle 109 provided at its laterally inner end portion for detachably fastening the seat belt 106. The seat belt 106 is drawn back into a retractor (not shown) provided interiorly of the seat backrest 101.

As shown in FIG. 8, a laterally outer locking mechanism 111 pivotally connects the laterally outer frame 103 of the seat backrest 101 with the rear outer end of the cushion frame 110, and is able to lock the laterally outer frame 103 at a desired sloping position with respect to the cushion frame 110.

Likewise, a laterally inner locking mechanism 112 pivotally connects the laterally inner frame 104 of the seat backrest 101 with the rear inner end of the cushion frame 110, and is able to lock the laterally inner frame 104 at the desired sloping position with respect to the cushion frame 110.

The laterally outer locking mechanism 111 is also equipped with a release lever 113, which is operated by a passenger. If the extreme end portion of the release lever 113 is lifted by the passenger, the locked state between the laterally outer frame 103 and the cushion frame 110 by the laterally outer locking mechanism 111 is released, and at the same time, a shaft 114 connecting the laterally outer locking mechanism 111 and laterally inner locking mechanism 112 together is rotated. The rotation of the shaft 114 releases the laterally inner frame 104 and cushion frame 110 locked by the laterally inner locking mechanism 112.

Conversely, if the lifted release lever 113 is lowered to its original position, the laterally outer frame 103 and cushion frame 110 are relocked and the laterally inner frame 104 and cushion frame 110 are relocked.

Note that the reclining seat 100 is constructed such that if relative rotation occurs between the laterally outer and inner locking mechanisms 111, 112 and the shaft 114, the locked state between the seat backrest 101 and the seat cushion 102 by the laterally outer and inner locking mechanisms 111, 112 is released.

Figure 9:
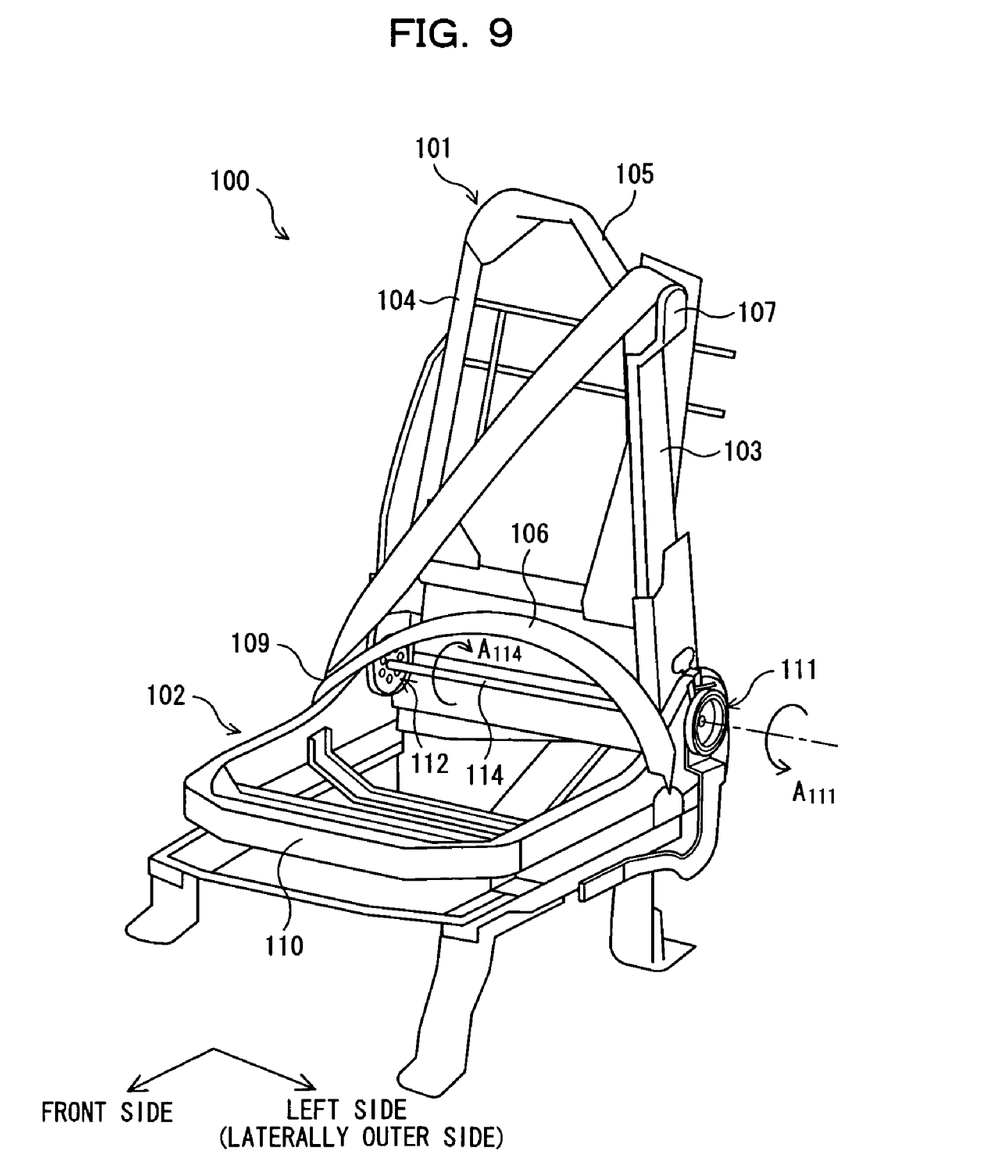
FIG. 9 is a perspective view showing the state in which the conventional reclining seat is deformed by a car crush, etc.

That is, as shown in FIG. 9, if the front of a vehicle with the reclining seat 100 collides, the upper end portion of the laterally outer frame 103 is greatly tilted forward, but the laterally inner frame 104 is not particularly deformed. The reason is because the locked state between the laterally outer frame 103 and the cushion frame 110 by the laterally outer locking mechanism 111 is released.

That is, if the front of the vehicle running forward collides, the passenger is held in the reclining seat 100 by the seat belt 106 without being slipped out of the reclining seat 100, but a great load is applied to the seat belt 106 and also to the retractor 107 supporting an end of the seat belt 106. Because of this, the upper end portion of the laterally outer frame 103 is tilted forward.

If the upper end portion of the laterally outer frame 103 is tilted forward, the laterally outer locking mechanism 111 provided on the laterally outer frame 103 rotates in an anticlockwise direction in view from left side of the seat 100 indicated by an arrow $A_{111}$ in FIG. 9. At this time, no deformation occurs in the laterally inner frame 104, so the laterally inner locking mechanism 112 does not rotate.

In addition, the laterally outer locking mechanism 111 and laterally inner locking mechanism 112 are constructed such that they allow the shaft 114 to rotate in the clockwise direction indicated by an arrow $A_{114}$ in FIG. 9 but not to rotate in the opposite direction.

Therefore, even if the front of the vehicle collides and therefore the laterally outer locking mechanism 111 rotates in the anticlockwise direction, the shaft 114 will not rotate.

Because of this, if the front of the vehicle collides, and the laterally outer locking mechanism 111 rotates in the anticlockwise direction, relative rotation takes place between the laterally outer locking mechanism 111 and the shaft 114, even when the release lever 114 is not operated. As a result, the locked state between the laterally outer frame 103 and the shaft 114 by the laterally outer locking mechanism 111 is released. To solve such a problem, a technique has been proposed in Japanese patent laid-open publication No. 2004-290243 (hereinafter referred to as patent document 1). Note that in the following description of patent document 1, a reference numeral enclosed within brackets indicates a reference numeral employed in the drawings of patent document 1.

Figure 1:
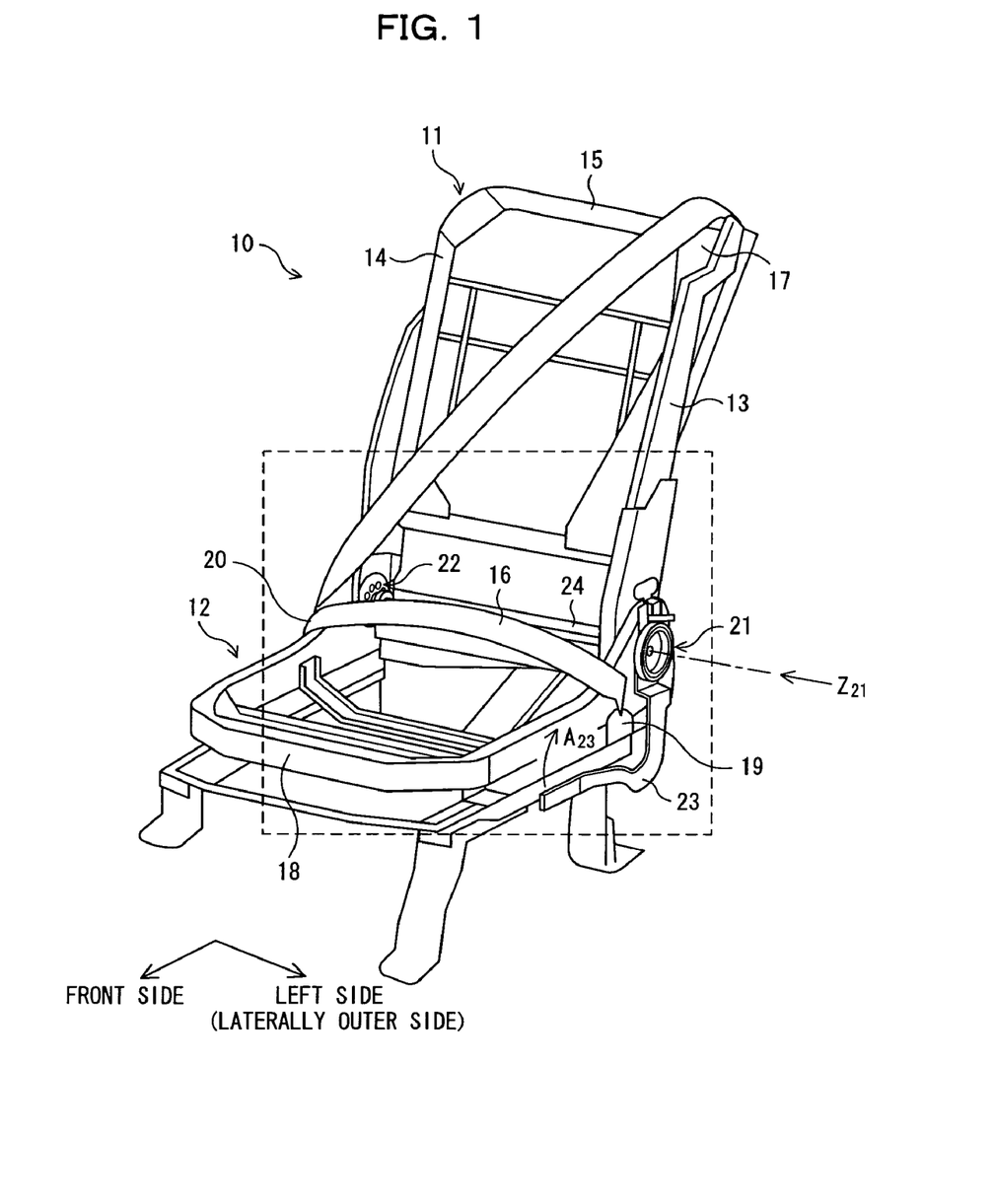
FIG. 1 is a perspective view showing a reclining seat constructed in accordance with a preferred embodiment of the present invention.
Figure 2:
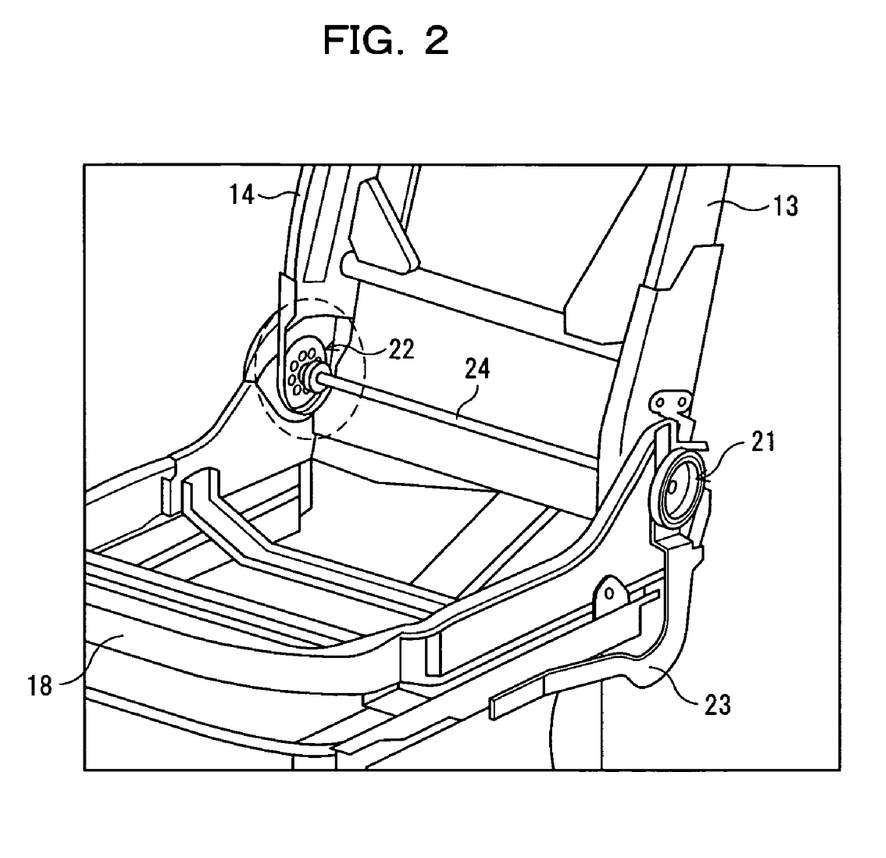
FIG. 2 is a perspective view showing the integral part of the reclining seat constructed in accordance with the preferred embodiment.
Figure 3:
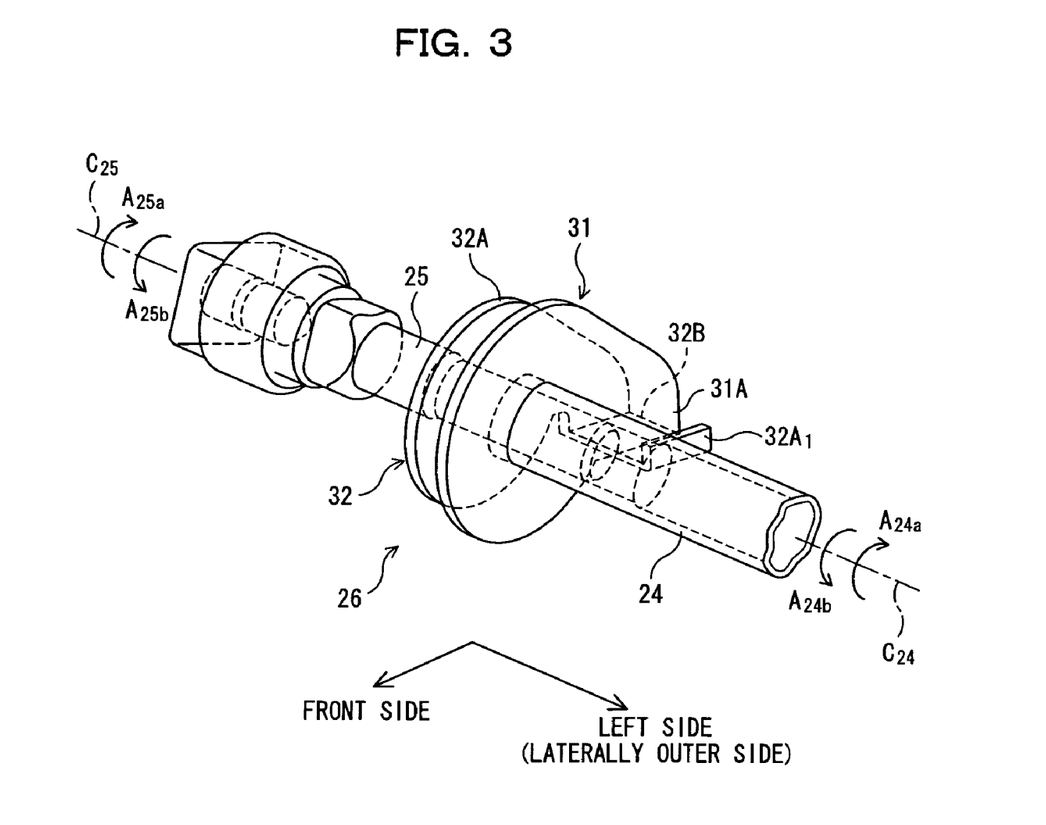
FIG. 3 is a perspective view showing the disengaging mechanism of the reclining seat constructed in accordance with the preferred embodiment.
Figure 4:
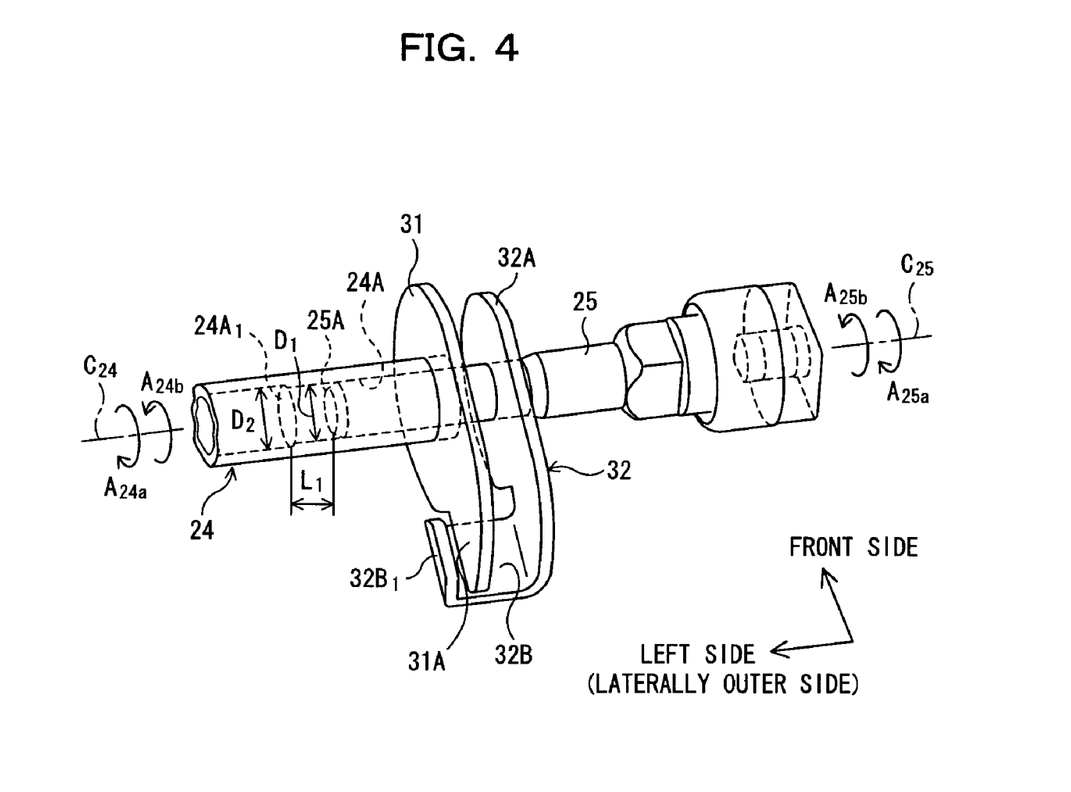
FIG. 4 is a perspective view showing the disengaging mechanism of the reclining seat constructed in accordance with the preferred embodiment.

As shown in each FIG. 2-4, the technique of the patent document 1 aims to avoid rotate relatively between a rod (80) and a shaft (84a) even when the shaft (84a) connected with one seat back frame (12a) rotates as shown in FIG. 1 by such a manner that forming recesses (81) in the rod (80) and forming projections (85) in locking mechanisms (51a and 51b).

However, it is not prefer to form the recesses (81) in the rod (80) and form the projections (85) in the locking mechanisms (51a and 51b) as the technique of patent document 1 because the labor and cost of production must be increased due to high-precision process is required.

Further, in the technique of patent document 1, it is impossible to avoid relative rotation between the rod (80), which is a pipe, and the shafts (84a and 84b) beyond the length of recesses (81). Accordingly, when the shaft (84a) tries to move beyond the recesses (81), the rod (80) and the shafts (84a and 84b) rotate together. Consequently it is impossible to prevent the deformation of the seat back frame (12a) due to the unintentional releasing of locking mechanisms (51a and 51b) happens.

SUMMARY OF THE INVENTION

The present invention has been made in view of the circumstances described above. Accordingly, it is the primary object of the present invention to provide a reclining seat that is capable of preventing deformation with a simpler structure when subjected to a shock by a car crash, etc.

To achieve the aforementioned object, there is provided a reclining seat which comprises nine major components: (1) a seat backrest pivotally supported on a seat cushion; (2) a first backrest frame disposed to form one side of the seat backrest; (3) a second backrest frame disposed to form the other side of the seat backrest and faced to the first backrest frame; (4) a first locking mechanism for locking the first backrest frame at a desired sloping position with respect to the seat cushion; (5) a second locking mechanism for locking the second backrest frame at the sloping position with respect to the seat cushion; (6) a release lever provided to pivot on the first locking mechanism; (7) a first shaft for releasing the first backrest frame locked by the first locking mechanism by being rotated with respect to the first locking mechanism by the release lever; (8) a second shaft for releasing the second backrest frame locked by the second locking mechanism by rotating with respect to the second locking mechanism; and (9) a disengaging unit, provided between the first shaft and the second shaft, for transmitting only one-directional rotation of the first shaft to the second shaft. The disengaging unit comprises a first plate mounted on the first shaft, and a second plate mounted on the second shaft. The second shaft is engaged by the first plate when the first shaft rotates in one direction and is disengaged from the first plate when the first shaft rotates in a direction opposite from the one direction.

BRIEF DESCRIPTION OF THE DRAWINGS

The nature of this invention, as well as other objects and advantages thereof, will be explained in the following with reference to the accompanying drawings, in which like reference numerals designate the same or similar parts throughout the figures and wherein.

DETAILED DESCRIPTION OF THE PREFERRED EMBODIMENTS

The structure of a reclining seat according to a preferred embodiment of the present invention will be described hereinafter with reference to the drawings.

As shown in FIGS. 1 and 2, the reclining seat 10 chiefly comprises a seat backrest 11 and a seat cushion 12.

The seat backrest 11 includes a laterally outer frame (first backrest frame) 13 disposed to form the left side (laterally outer side) of the seat backrest 11, a laterally inner frame (second backrest frame) 14 disposed to form the right side (laterally inner side) of the seat backrest 11, and an upper frame 15 connecting the upper end portion of the laterally outer frame 13 and the upper end portion of the laterally inner frame 14 together.

The seat cushion 12 includes a cushion frame 18. The cushion frame 18 has an anchor 19 provided at its rear outer end for fixing a seat belt 16, and further has a buckle 20 provided at its rear inner end for detachably fastening the seat belt 16.

The laterally outer frame 13 of the seat backrest 11 has a shoulder anchor 17 provided at it supper end portion for supporting one end of the seat belt 16. Note that the seat belt 16 is drawn back into a retractor (not shown) provided interiorly of the seat backrest 11.

A laterally outer locking mechanism (first locking mechanism) 21 pivotally connects the laterally outer frame 13 with the rear outer end of the cushion frame 18, and is able to lock the laterally outer frame 13 with respect to the seat cushion 12 at a desired sloping position with respect to the cushion frame 18.

Similarly, a laterally inner locking mechanism (second locking mechanism) 22 pivotally connects the laterally inner frame 14 with the rear inner end of the cushion frame 18, and is able to lock the laterally inner frame 14 with respect to the seat cushion 12 at the desired sloping position with respect to the cushion frame 18.

The laterally outer locking mechanism 21 is equipped with a release lever (pivot lever) 23, which is operated by a passenger. As indicated by an arrow $A_{23}$ in FIG. 1, if the release lever 23 is lifted, the locked state between the laterally outer frame 13 and the cushion frame 18 by the laterally outer locking mechanism 21 is released, and likewise, the locked state between the laterally inner frame 14 and the cushion frame 18 by the laterally inner locking mechanism 22 is released.

Figure 5:
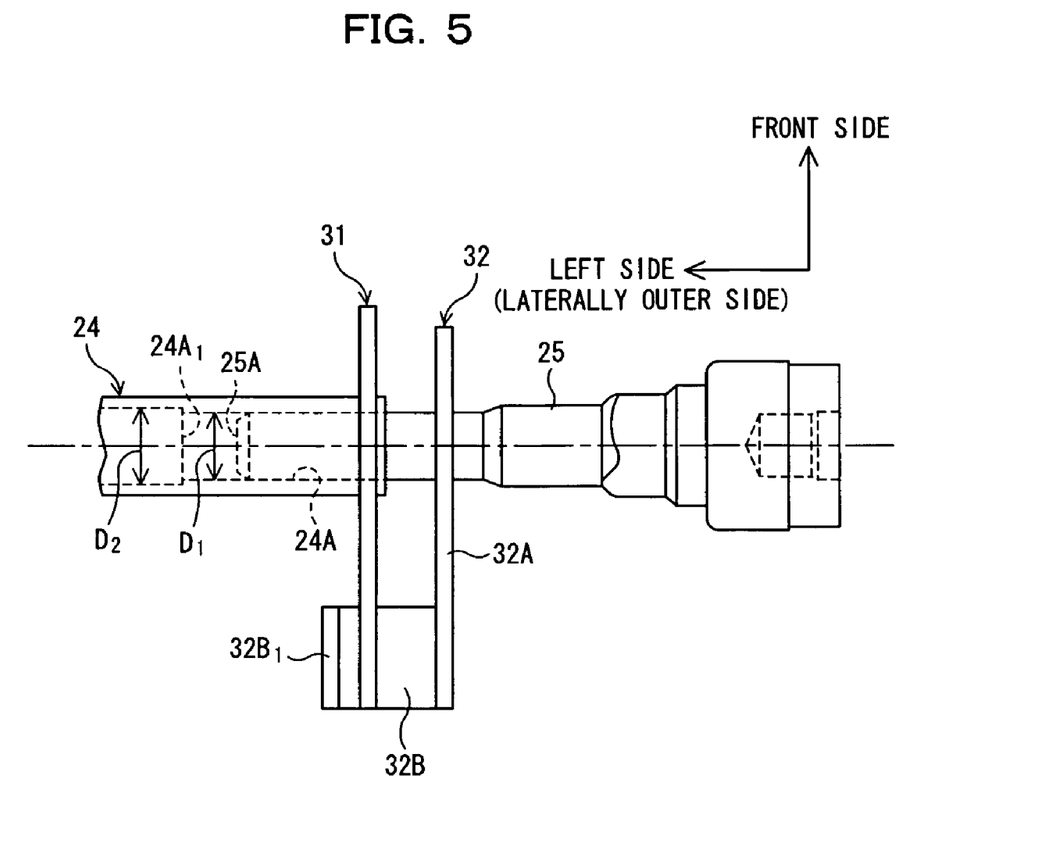
FIG. 5 is a plan view showing the disengaging mechanism of the reclining seat constructed in accordance with the preferred embodiment.

This is because a laterally outer shaft (first shaft) 24 rotatably connected with respect to the laterally outer locking mechanism 21 is mechanically linked to the release lever 23, and because, as shown in FIGS. 3, 4, and 5, a laterally inner shaft (second shaft) 25 is rotatably connected with respect to the laterally inner locking mechanism 22, and the laterally outer shaft 24 and laterally inner shaft 25 are connected by a disengaging mechanism 26 so that the laterally outer shaft 24 can be disengaged from the laterally inner shaft 25.

That is, if the release lever 23 is lifted by the passenger, the laterally outer shaft 24 rotates in one direction (i.e., a clockwise direction indicated by an arrow 24a in FIG. 3). The rotation of the laterally outer shaft 24 is transmitted to the laterally inner locking 22 through the disengaging mechanism 26.

Therefore, the rotation of the laterally outer shaft 24 causes relative rotation to occur between the laterally outer shaft 24 and the laterally outer locking mechanism 21, whereby the locked state between the laterally outer frame 13 and the cushion frame 18 is released. Similarly, the rotation of the laterally inner shaft 25 causes relative rotation to occur between the laterally inner shaft 25 and the laterally inner locking mechanism 22, so that the locked state between the laterally inner frame 14 and the cushion frame 18 is released.

Conversely, if the lifted release lever 23 is lowered to its original position, the laterally outer frame 13 and cushion frame 18 are relocked by the laterally outer locking mechanism 21, and the laterally inner frame 14 and cushion frame 18 are relocked by the laterally inner locking mechanism 22.

As shown in FIG. 4, the laterally outer shaft 24 is formed from a hollow pipe member and has at its laterally inner end portion an insertion opening 24A, into which the laterally outer end portion 25A of the laterally inner shaft 25 is inserted. The insertion opening 24A has an inside diameter of $D_1$, and a predetermined depth (e.g., 4 to 5 cm) from the inner end of the laterally outer shaft 24.

Therefore, even when the laterally outer frame 13 is deformed so that the distance between the laterally outer locking mechanism 21 and the laterally inner locking mechanism 22 becomes wide, the laterally inner shaft 24 and the laterally outer shaft 25 can be prevented from being easily separated from each other.

The bottom portion $24A_1$ of the insertion opening 24A and the laterally outer end 25A of the laterally inner shaft 25 inserted in the insertion opening 24A are spaced by a predetermined distance $L_1$ (e.g., about 1 to 2 cm). Therefore, even when the reclining seat 10 deforms so as to make the distance between the laterally outer locking mechanism 21 and the laterally inner locking mechanism 22 shorter, the laterally outer end 25A of the laterally inner shaft 25 is prevented from being pushed against the bottom portion $24A_1$ of the insertion opening 24A of the laterally inner shaft 24, whereby the relative rotation between the laterally outer shaft 24 and the laterally inner shaft 25 can be prevented from being regulated.

In addition, the inside diameter $D_2$ of the laterally outer shaft 24 is made larger than the diameter $D_1$ of the insertion opening 24A, resulting in a reduction in the weight of the laterally outer shaft 24.

The laterally outer shaft 24 and laterally inner shaft 25 are disposed so that the respective longitudinal axes $C_{24}$ and $C_{25}$ coincide with each other.

As shown in FIGS. 3, 4, and 5, the disengaging mechanism 26 comprises a laterally outer plate (first plate) 31 mounted on the laterally inner end portion of the laterally outer shaft 24, and a laterally inner plate (second plate) 32 mounted on the laterally inner shaft 25 near the laterally outer end portion 25A thereof.

The laterally outer plate 31 is disposed to intersect the longitudinal axis $C_{24}$ of the laterally outer shaft $C_{24}$ at right angles, and is mounted on the laterally inner end portion of the laterally outer shaft 24. The laterally outer plate 31 has a protrusion 31A that extends backwards.

The laterally inner plate 32 comprises a fixed portion 32A and a receiving portion 32B which is engaged by the protrusion 31A of the laterally outer plate 31.

The fixed portion 32A of the laterally inner plate 32 is disposed to intersect the longitudinal axis $C_{25}$ of the laterally inner shaft 25 at right angles and face the laterally outer plate 31, and is a flat plate fixed near the laterally outer end portion 25A of the laterally inner shaft 25.

The receiving portion 32B of the laterally inner plate 32 is formed integrally with the fixed portion 32A and projects from the fixed portion 32a toward the laterally outer locking mechanism 21 in parallel to the longitudinal axis $C_{25}$. When the release lever 23 is held in its original position, or when it is lifted, the receiving portion 32B is engaged by the protrusion 31A of the laterally outer plate 31.

Therefore, if the laterally outer shaft 24 rotates in one direction (see the arrow A24a in FIG. 3) by lifting the release lever 23, the protrusion 31A of the laterally outer plate 31 engages with the receiving portion 32B of the laterally inner plate 32, and consequently, the laterally inner shaft 25 also rotates in the one direction (see the arrow A25a in FIG. 3).

Conversely, if the laterally outer shaft 24 rotates in a direction opposite from the one direction (see the arrow A24b in FIG. 3), the protrusion 31A of the laterally outer plate 31 is disengaged from the receiving portion 32B of the laterally inner plate 32, and consequently, the laterally inner shaft 25 does not rotate.

The laterally inner plate 32 further has a flange portion 32B1, which is formed on the laterally outer end of the receiving portion 32B so as to face the fixed portion 32A. Therefore, even when the laterally outer plate 31 is moved toward the laterally outer locking mechanism 21, the flange portion 32B1 is able to prevent the protrusion 31A of the laterally outer plate 31 from slipping out of the receiving portion 32B.

Since the laterally outer and inner locking mechanisms 21 and 22 are well known in the prior art, a description of these mechanisms will not be given.

The reclining seat 10 according to the preferred embodiment possesses the following advantages because it is constructed as described above.

As shown in FIG. 1, by the seat belt 16 that is supported by both the shoulder anchor 17 fixed on the upper end portion of the laterally outer frame 13 of the reclining seat 10 and the lower anchor 19 and buckle 20 attached to both sides of the cushion frame 18, the passenger can be securely held in the reclining seat 10.

If the release lever 23 is lifted as indicated by the arrow $A_{23}$ in FIG. 1 by the passenger, the locked state between the laterally outer seat backrest frame 13 and the cushion frame 18 by the laterally outer locking mechanism 21 is released, and similarly, the locked state between the laterally inner seat backrest frame 14 and the cushion frame 18 by the laterally inner locking mechanism 22 is released. This enables the passenger to tilt the seat backrest 11 backwards at a desired angle with respect to the seat cushion 12.

Figure 6:
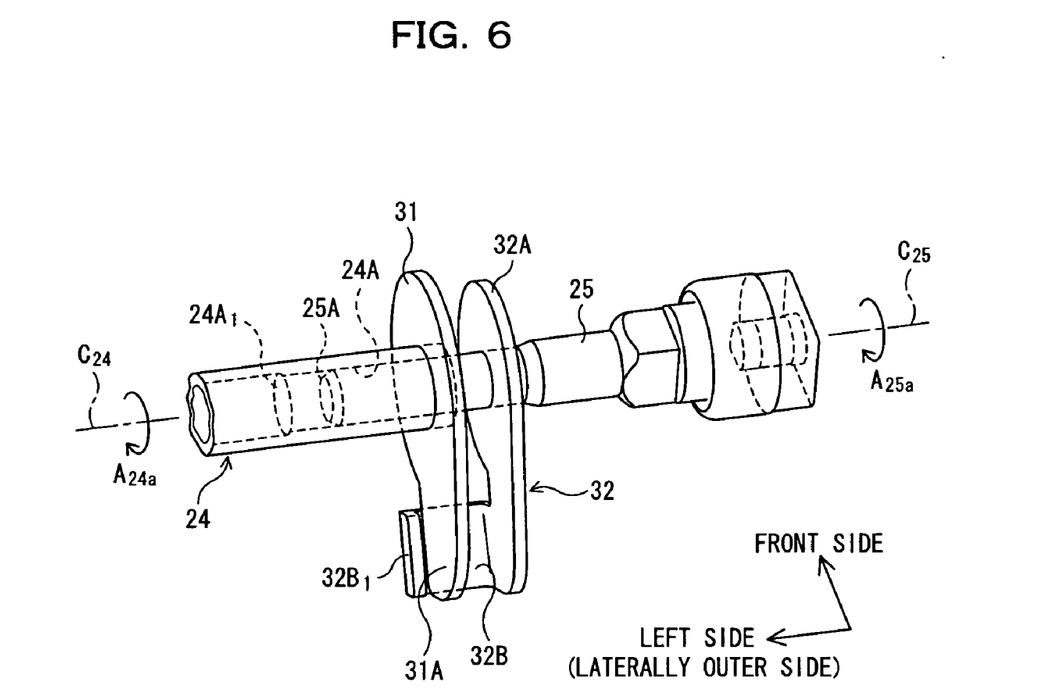
FIG. 6 is a perspective view showing the disengaging mechanism when the release lever of the reclining seat is lifted.

When the release lever 23 is lifted by the passenger, the disengaging mechanism 26 operates as shown in FIG. 6. That is, if the release lever 23 is lifted by the passenger, the laterally outer shaft 24 mechanically linked to the release lever 23 rotates as indicated by an arrow A24a in FIG. 6. The rotation of the laterally outer shaft 24 causes the laterally outer plate 31 mounted on the laterally inner end of the laterally outer shaft 24 to rotate in the same direction indicated by the arrow A24a in FIG. 6.

As a result, since the protrusion 31A of the laterally outer plate 31 engages the receiving portion 32A of the laterally inner plate 32, the laterally inner plate 32 mounted near the left end portion of the laterally inner shaft 25 also rotates as indicated by an arrow A25a in FIG. 6. Therefore, the laterally inner shaft 25 having this laterally inner plate 32 mounted thereon is likewise rotated as indicated by the arrow A25a in FIG. 6.

Thus, if the release lever 23 is lifted by the passenger, the laterally outer shaft 24 rotates as indicated by the arrow 24a in FIG. 6 and also the laterally inner shaft 25 rotates in the same direction indicated by the arrow 25a in FIG. 6, whereby the locked state between the seat cushion 12 and the seat backrest 11 by the laterally outer locking mechanism 21 and laterally inner locking mechanism 22 is released.

Figure 7:
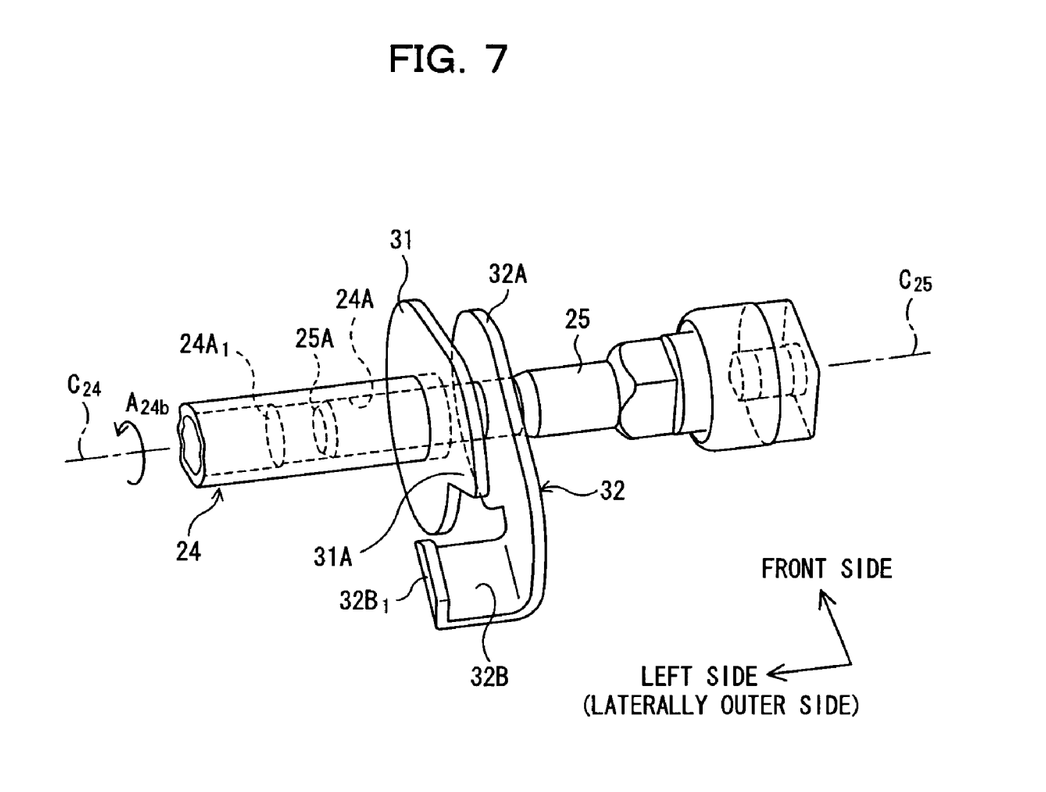
FIG. 7 is a perspective view showing the disengaging mechanism when an upper end of the laterally outer frame of the reclining seat is tilted forward by a car crush, etc.

As shown in FIG. 7, in the case where the front of the vehicle collides, a great load is applied to the seat belt 16 holding the passenger, and therefore the upper end portion of the laterally outer frame 13 of the seat backrest 11 having the shoulder anchor 17 is moved forward, the laterally outer locking mechanism 21 and laterally outer shaft 24 rotate as indicated by an arrow A24b in FIG. 7.

The laterally outer plate 31 mounted on the laterally inner end portion of the laterally outer shaft 24 rotates as indicated by the arrow A24b in FIG. 7, but the protrusion 31A of the laterally outer plate 31 is disengaged from the receiving portion 32B of the laterally inner plate 32.

Therefore, in contrast with the case where the release lever 23 is lifted (see FIG. 6), the rotation of the laterally outer shaft 24 in the direction indicated by the arrow A24b is not transmitted to the laterally inner shaft 25.

More specifically, when the upper end portion of the laterally outer frame 13 equipped with the shoulder anchor 17 is moved forward and therefore the laterally outer locking mechanism 21 rotates as indicated by the arrow A24b, the laterally outer shaft 24 follows the rotation of the laterally outer locking mechanism 21 and is allowed to rotate as indicated by the arrow A24b. Thus, relative rotation can be prevented from occurring between the laterally outer locking mechanism 21 and the laterally outer shaft 24.

The laterally outer shaft 24 and the laterally inner shaft 25 are disposed so that the respective longitudinal axes $C_{24}$ and $C_{25}$ are aligned with each other. Further, the laterally outer end portion 25A is rotatably inserted in to the insertion opening 24A of the laterally outer shaft 24. Accordingly, the relative rotation is secured between the laterally outer shaft 24 and the laterally inner shaft 25.

Thus, unlike the conventional reclining seat 100 described with reference to FIGS. 8 and 9, according to the reclining seat 10 of the preferred embodiment, even in the case where the upper end portion of the laterally outer frame 13 equipped with the shoulder anchor 17 is moved forward and therefore the laterally outer locking mechanism 21 rotates as indicated by the arrow A24b, the locked state by the laterally outer locking mechanism 21 can be prevented from being released, whereby deformation of the reclining seat 10 can be reliably prevented.

Since the reclining seat 10 is equipped with the shoulder anchor 17, passenger's safety can be increased. That is, by providing the shoulder anchor 17 in the reclining seat 10 as in the preferred embodiment, a change in the position of the seat belt 16 with respect to the passenger can be prevented regardless of a seat position relative to the vehicle's body, whereby a contribution can be made to an increase in the passenger's safety.

The structure of the reclining seat 10 in the preferred embodiment does not require a highly accurate machining operation required of the technique of the aforementioned patent document 1 described in the Related Art. Therefore, there is no increase in the number of working steps and no increase in machining costs.

In the technique of the aforementioned patent document 1, as shown in FIGS. 3 and 4 thereof, relative rotation that occurs between an interlocking rod (80) and shafts (84a, 84b) can be prevented by the amount corresponding to the size of a groove (81). Therefore, when the amount of displacement of the shafts (84a, 84b) is larger than the size of the groove (81), relative rotation occurs between the interlocking rod (80) and the shafts (84a, 84b), and consequently, there are cases where locking mechanisms (51a, 51b) are undesirably released.

In contrast to this, according to the structure of the reclining seat 10 of the preferred embodiment, in the case where the laterally outer plate 31 of the disengaging mechanism 26 is rotated away from the laterally inner plate 32, they engage each other when the laterally outer plate 31 is rotated through about 360 degrees. Thus, relative rotation between the laterally outer plate 31 and the laterally inner plate 32 can be set larger.

Therefore, even in the case where the laterally outer frame 13 is greatly moved forward and therefore the amount of rotation of the laterally outer locking mechanism 21 is large, the occurrence of relative rotation between the laterally outer locking mechanism 21 and the laterally outer shaft 24 can be reliably prevented, whereby deformation of the reclining seat 10 can be reliably prevented.

While the present invention has been described with reference to the preferred embodiment thereof, the invention is not to be limited to the details given herein, but may be modified within the scope of the invention hereinafter claimed.

In the preferred embodiment, the shoulder anchor 17 is provided on the upper end portion of the laterally outer frame (first backrest frame) 13, and when the front of the vehicle collides, the upper end portion of the laterally outer frame 13 is moved forward. However, the present invention is not limited to this case, but is also applicable to the case where the shoulder anchor 17 is not provided on the upper end portion of the laterally outer frame 13.

For example, even in the case where the front of a vehicle with the reclining seat 10 of the present invention collides, a passenger or baggage on the rear seat collides with the back of the first seat backrest frame 13, and as a result, the upper end portion of the first seat backrest frame 13 is moved forward, the locked state between the first seat backrest frame 13 and the seat cushion 12 by the first locking mechanism 21 can be prevented from being released.

In the preferred embodiment, it has been described that the release lever 23 for rotating the laterally outer shaft 24 is equipped in the laterally outer locking mechanism 21. However, the present invention is not limited to this arrangement. For instance, the laterally outer shaft 24 may be rotated by an electric motor.

In the preferred embodiment, it has been described that the retractor (not shown) is provided interiorly of the seat backrest 11. However, the present invention is not limited to such a case. For instance, the retractor may be provided interiorly of the seat cushion 12, or may be provided in the vehicle's body.

The structure of the reclining seat 10 of the present invention may be applied to a driver's seat, passenger's seat, or rear seat.

In the preferred embodiment, while it has been described that the reclining seat 10 is employed in vehicles, it may be employed in aircraft, railroads, craft, and so forth.

What is claimed is:

1. A reclining seat comprising:
   a seat backrest pivotally supported on a seat cushion;
   a first backrest frame disposed to form one side of said seat backrest;
   a second backrest frame disposed to form the other side of said seat backrest;

a first locking mechanism for locking said first backrest frame at a desired sloping position with respect to said seat cushion;

a second locking mechanism for locking said second backrest frame at said sloping position with respect to said seat cushion;

a release lever provided to pivot on said first locking mechanism;

a first shaft for releasing said first backrest frame locked by said first locking mechanism by being rotated with respect to said first locking mechanism by said release lever;

a second shaft for releasing said second backrest frame locked by said second locking mechanism by rotating with respect to said second locking mechanism; and a disengaging unit, provided between said first shaft and said second shaft, for transmitting only one-directional rotation of said first shaft to said second shaft;

wherein said disengaging unit includes a first plate mounted on said first shaft, and a second plate, mounted on said second shaft, which is engaged by said first plate when said first shaft rotates in one direction and is disengaged from said first plate when said first shaft rotates in another direction.

2. The reclining seat according to claim 1, further comprising:

an anchor attached to an upper end portion of said first backrest frame for fixing a seat belt.

* * * * *